3,346,488
DEFLOCCULATION OF SOLID MATERIALS IN AQUEOUS MEDIUM
John W. Lyons and Riyad R. Irani, St. Louis, Mo., assignors to Monsanto Company, St. Louis, Mo., a corporation of Delaware
No Drawing. Filed Aug. 24, 1965, Ser. No. 482,296
22 Claims. (Cl. 252—8.5)

This is a continuation-in-part of application Ser. No. 230,005, filed Oct. 11, 1962, and now abandoned.

This invention relates to aqueous dispersions of finely divided solid materials in a deflocculated condition and methods for their preparation. More particularly this invention relates to the use of amino methylphosphonic acids and their salts as deflocculating agents for finely divided solid materials in an aqueous slurry.

Many industrial processes today use aqueous suspensions or slurries in which the water is used as the vehicle for transporting the solids. The phenomenon of deflocculation, that is, the separation of aggregates into smaller units, plays an important role in the use of slurry systems by altering the flow or rheological properties of the system. There are in use today many and various kinds of deflocculating agents, one class of which, the condensed phosphates, have gained widespread use in such slurry systems as oil well drilling muds, kaolin processing, wet processing of cement, water-base paint pigment suspensions and the like. However, their susceptibility to hydrolysis in aqueous slurry systems is well known, being primarily dependent on the temperature and pH conditions of the system. This limitation sometimes severely restricts their use. As can be appreciated, therefore, a "hydrolytically stable" deflocculating agent would represent an extremely important advancement in this art.

Therefore, it is an object of this invention to provide improved aqueous dispersions of finely divided solid materials in a deflocculated condition.

It is another object of this invention to provide a process for dispersing in a deflocculated condition finely divided solid materials in an aqueous medium by use of a deflocculating agent.

A further object of this invention is to provide a "hydrolytically stable" deflocculating agent for use in dispersing in a deflocculated condition finely divided solid materials in an aqueous medium.

A further object of this invention is to provide an improved deflocculating agent for use in such slurry systems as oil well drilling muds, kaolin processing, wet processing of cement, water-base paint pigment suspensions and the like.

Other objects will become apparent from the detailed description and the claims.

It has now been discovered that aqueous dispersions of finely divided solid materials in a deflocculated condition can be prepared by incorporating therein a minor amount of one or more amino methylphosphonic acids, or a salt thereof, said acids being of the following general formula:

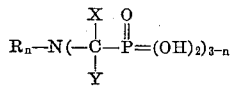

wherein: $n$ represents an integer 0 or 1; X and Y represent hydrogen or alkyl; R represents hydrogen, aliphatic hydrocarbon, halo-substituted aliphatic hydrocarbon, hydroxy-substituted aliphatic hydrocarbon or:

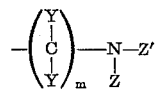

wherein: $m$ represents an integer from 1 to 30; X and Y represent hydrogen or alkyl; Z represents hydrogen or:

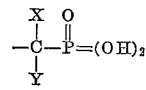

Z' represents

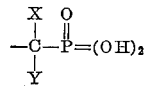

or

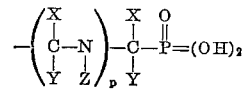

wherein: $p$ represents an integer from 1 to 30. As used hereinafter the term "amino methylphosphonic acids" generically describes all of the foregoing.

With respect to the foregoing general formula it should be noted that when R is either an aliphatic hydrocarbon, halo-substituted aliphatic hydrocarbon or hydroxy-substituted aliphatic hydrocarbon, it is preferably either the saturated or double-bonded unsaturated form containing from 1 to 30 carbon atoms with 6 to 30 carbon atoms being particularly preferred. When either X or Y is an alkyl group it is preferred that the alkyl group contains from 1 to 30 carbon atoms with lower alkyl groups containing from 1 to about 4 carbon atoms being particularly preferred.

For example purposes, the following compounds are presented as being illustrative of the novel deflocculating agents:

(1) $N(CH_2PO_3H_2)_3$
(2) $N(C(CH_3)(CH_3)PO_3H_2)_3$
(3) $CH_3N(CH_2PO_3H_2)_2$
(4) $nC_4H_9N(CH_2PO_3H_2)_2$
(5) $(H_2O_3PCH_2)_2NCH_2CH_2N(CH_2PO_3H_2)_2$
(6) $(H_2O_3PCH_2)_2NCH_2CH_2N(CH_2PO_3H_2)CH_2CH_2N(CH_2PO_3H_2)_2$
(7) $(H_2O_3PCH_2)_2NCH_2CH_2[N(CH_2PO_3H_2)(CH_2CH_2)]_2N(CH_2PO_3H_2)_2$
(8) $nC_{18}H_{35}N(CH_2PO_3H_2)_2$
(9) $OHCH_2CH_2N(CH_2PO_3H_2)_2$
(10) $ClCH_2CH_2CH_2N(CH_2PO_3H_2)_2$
(11) $(H_2O_3PCH_2)_2N(CH_2)_6N(CH_2PO_3H_2)_2$
(12) $(H_2O_3PCH_2)_2N(CH_2)_{10}N(CH_2PO_3H_2)_2$
(13) $(C_{14}H_{29}N(CH_2PO_3H_2)_2$
(14) $C_{10}H_{21}N(CH_2PO_3H_2)_2$
(15) $C_6H_{13}N(CH_2PO_3H_2)_2$
(16) $ClCH_2(CH_2)_{11}N(CH_2PO_3H_2)_2$
(17) $C_3H_6N(CH_2PO_3H_2)_2$
(18) $OHCH_2(CH_2)_{13}N(CH_2PO_3H_2)_2$
(19) $C_{20}H_{41}N(CH_2PO_3H_2)_2$
(20) $(H_2O_3PCH_2)_2N(CH_2)_6N(CH_2PO_3H_2)(CH_2)_6N(CH_2PO_3H_2)_2$
(21) $C_{15}H_{31}N(CH_2PO_3H_2)_2$
(22) $FCH_2(CH_2)_5N(CH_2PO_3H_2)_2$
(23) $CH_3CH_2CH_2CH_2CH(OH)CH_2N(CH_2PO_3H_2)_2$
(24) $CH_3CH(Br)CH_2N(CH_2PO_3H_2)_2$
(25) $C_8H_{17}N(CH_2PO_3H_2)_2$

The amino methylphosphonic acids and their salts may be prepared by various means, one of which comprises as a first step the preparation of the corresponding esters by reacting under reactive conditions a primary amine or ammonia, a compound containing a carbonyl group such as an aldehyde or ketone, and a dialkylphosphite. The free amino methylphosphonic acids and their salts may be prepared by hydrolysis of the esters using strong mineral acids such as hydrochloric acid and the like.

The following general reaction equations are illustrative of the preparation of the esters as outlined above.

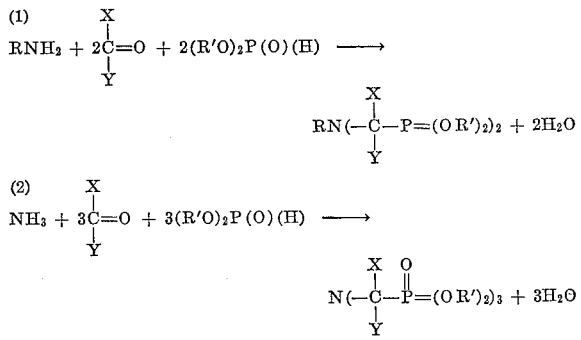

(1)
$$RNH_2 + 2C(=O)\underset{Y}{\overset{X}{|}} + 2(R'O)_2P(O)(H) \longrightarrow$$
$$RN(-\underset{Y}{\overset{X}{\underset{|}{C}}}-P=(OR')_2)_2 + 2H_2O$$

(2)
$$NH_3 + 3C(=O)\underset{Y}{\overset{X}{|}} + 3(R'O)_2P(O)(H) \longrightarrow$$
$$N(-\underset{Y}{\overset{X}{\underset{|}{C}}}-\overset{O}{\overset{\|}{P}}=(OR')_2)_3 + 3H_2O$$

wherein R, X and Y represent the same groups as in the foregoing general formula and R' represents alkyl.

By the term "hydrolytically stable" as used herein is meant a substantial resistance by the deflocculating agent to hydrolysis or degradation under various pH and temperature conditions. For example, a 20 gram sample of penta sodium amino tri(methylphosphonate), N-(CH$_2$-PO$_3$Na$_2$)$_2$(CH$_2$-PO$_3$HNa), was dissolved in 100 ml. of water. A 25 ml. portion of the solution was added to a 25 ml. portion of 12 M HCl to give a 10% solution of the agent in HCl. Another 25 ml. portion of the solution was added to a 25 ml. portion of 10% NaOH to give a 10% solution of the agent in a 5% solution of NaOH. The foregoing 10% solutions were boiled for a period of four hours, at the end of which both solutions exhibited no change in physical properties. Nuclear magnetic resonance spectra showed the two 10% solutions to be identical with unheated fresh 10% solutions of the agent in similar acid and alkaline solutions, thus establishing the resistance of the agent to hydrolysis or degradation under severe temperature and pH conditions. It should be noted that all known polyphosphates, whether in the acid, salt or ester form, would hydrolyze or degrade completely under the foregoing conditions. Another sample, in this instance 2 grams of the anhydrous penta sodium amine tri(methylphosphonate), a dry powder, was heated on a thermogravimetric balance. Below a temperature of 300° C. less than 1% weight loss resulted. X-ray diffraction patterns of the heated sample and an unheated sample were identical. As is believed apparent from the foregoing the deflocculating agents of the instant invention are hydrolytically stable.

Generally stated, this invention relates to the use of amino methylphosphonic acids and their salts as improved deflocculating agents for aqueous dispersions of finely divided solid materials and, in addition, this invention also relates to the aqueous slurry compositions resulting therefrom and containing the improved deflocculating agent. It is to be understood that all water soluble salts of amino methylphosphonic acids are generally suitable for use, and, in particular, the water soluble alkali metal salts, such as the sodium, potassium and lithium salts, alkaline earth salts, such as the calcium and magnesium salt, ammonium salt, and the amine salts, as well as mixed salts of the foregoing, may be used to practice the invention. In particular, amine salts prepared from low molecular weight amines, i.e., having a molecular weight below about 300, and more particularly the alkyl amines, alkylene amines and alkanol amines containing not more than 2 amine groups, such as, ethylamine, diethylamine, propylamine, propylenediamine, hexylamine, 2-ethyl hexylamine, N-butylethanol amine, triethanol amine and the like, are the preferred amine salts.

The deflocculating agents of the present invention can be advantageously used for deflocculation purposes with many and various finely divided solid materials which are capable of being dispersed in an aqueous vehicle. Illustrative of such finely divided materials are organic solid materials such as coal inuluding lignite (brown coal), bituminous (soft coal), anthracite (hard coal), charcoal and the like and inorganic solid materials such as various clays, fuller's earth, bauxite, phosphate containing ores, argillaceous materials, calcareous materials, pigments which include ferric oxide, iron blues, red lead, white lead (basic carbonate), white lead (basic sulfate), lead chromate, zinc oxide, zinc chromate, zinc sulfide, lithopone, chromium oxide, titanium dioxide (Anatase), titanium dioxide (Rutile), antimony oxide, cadmium sulfide, lead titanate, extended pigments which include titanium-barium, titanium-calcium, zinc sulfide-magnesium or any combinations of pigments used to provide pigments of other than the primary colors which include lead chromate-lead oxide, iron blue and lead chromate, and the like. As being illustrative of the foregoing solid materials in slurry systems are oil well drilling muds, kaolin processing, wet processing of cement, water-base paint pigment suspensions, coal processing and the like. The foregoing solid materials and specific areas of utilizations are by no means the extent of their use, and therefore, the invention is not intended to be limited thereto. The amounts of the deflocculating agent necessary to deflocculate the slurry system in any specific instance depends, inter alia, on the viscosity desired, conditions of use, contaminants and the like, but in any event only minor amounts are usually sufficient, i.e., as little as 0.01% by weight of solids can give improved results and usually no more than about 1% by weight of solids is necessary in any application. Because it is believed that the ability of the deflocculating agent to deflocculate is enhanced by an increase in the number of phosphonic acid groups which ionize, it is preferred that the slurry system be at a pH of 5 or above.

The deflocculating agents of the present invention may be added to the slurry system as an aqueous solution or as a solid in powdered form or it may be incorporated as a dry solid with the substantially dry solid materials prior to being added to the aqueous vehicle. Alternatively, the dispersion and mixing may take place simultaneously by intimately mixing the solid materials with water and the deflocculating agent.

As previously mentioned the deflocculating agent is especially suited for use in drilling muds. High temperatures at substantial depths which sometimes reach 250° F., contamination by salt brines or as a result of cementing operations are among the factors which cause undesirable variations in viscosity properties of the muds. The ability of the drilling muds to maintain a suitable viscosity over a wide range of temperature and pH conditions is, therefore, a distinct and important requirement. It can be appreciated that a deflocculating agent which is hydrolytically stable over a wide range of temperature and pH conditions would be extremely well suited for use in drilling muds.

The drilling muds may be comprised of any conventional type material such as hydratable clay or colloidal clay bodies which are capable of being deflocculated or dispersed in an aqueous vehicle. Such clay materials as Wyoming bentonite, commercial medium-yield drilling clays mixed in various parts of the country such as Texas, Tennessee, and Louisiana are among those which are frequently encountered. Weighting material added to increase specific gravity such as barytes, iron oxide, calcium carbonate, silica and the like may also be included. The aqueous vehicle may be any type of suitable fresh or salt water such as is obtained from wells, lakes or the sea. In addition, the drilling muds of the invention may contain other additives, such as caustic, soda ash, quebracho, lime, cement, gypsum and the like.

The amino methylphosphonic acids or salts can be added directly to the drilling fluid as a dry powder, as a slurry suspended in a suitable liquid, or as a solution in a liquid such as water, and they may be incorporated therein at any convenient point in the mud circulation system. In some cases, it is advantageous to first prepare a substantially dry concentrate by adding the deflocculating agent to the clay and, if desired, the other abovementioned additives prior to incorporating such in the aqueous vehicle to prepare the drilling fluid. In such cases the concentrate drilling mud can contain some water (usually below about 10% by weight of the mud solids) such as the normal moisture content of the air dried solids. Generally, very little water is desired since the aqueous vehicle is added later when the drilling fluid is prepared.

It has been found the amino tri(lower alkylidenephosphonic acids) or their salts are especially preferred for use as deflocculating agents with inorganic finely divided solid materials such as clays used in drilling muds, kaolin, and the like. Amino tri(lower alkylidenephosphonic acids) are of the following formula:

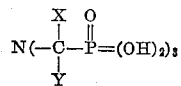

wherein: X and Y represent hydrogen or lower alkyl 1–4 carbon atoms).

The quantities of the aminotri(loweralkylidenephosphonic acids) or their salts to be added will vary with, among other things, the properties desired and the type of clay used. Quantities within the range of about 0.5–3 pounds of the deflocculating agent per 42 gallon barrel of drilling mud (usually weighing about 20 pounds per gallon) are usually quite satisfactory, that is, about 0.06 to about 0.3 weight percent based on the clay.

The following examples are presented to illustrate the invention.

Example 1

Into a conventional 3-necked, 3-liter flask fitted with a reflux condenser, stirrer and thermometer was added 600 grams of diethyl phosphite and 127.5 grams of 29% aqueous ammonia solution. The flask was placed in an ice bath and after the mixture had become cooled to about 0° C. 325 grams of 37% aqueous formaldehyde solution was added. The flask was removed from the ice bath and heated with the reaction occurring at about 100° C. After the reaction was completed the flask was allowed to cool to room temperature and the reaction products were extracted with benzene and separated by fractional distillation. Hexaethyl amino tri(methylphosphonate) distilled between 190°–200° C. at a pressure of .1 mm. and was obtained in a quantity of 184 grams. The following are the results to enable a comparison between the calculated percent constituents and found percent constituents:

Calculated: 36.78% C, 7.30% H, 3.53% N, 20.01% P.
Found: 38.54% C, 7.76% H, 3.00% N, 19.89% P.

The free acid, amino tri(methylphosphonic acid), $N(CH_2P(O)(OH)_2)_3$, was prepared by hydrolysis of a portion of the foregoing prepared ester. In a flask similar to that described above, 40 grams of the ester was refluxed with about 200 ml. of concentrated hydrochloric acid for a period of about 24 hours. The free acid, a syrupy liquid, crystallized on prolonged standing (about 1 week) in a dessicator. The yield was 20 grams. The equivalent weight of the free acid, by titration, was found to be 62 as compared with the calculated value of 59.8.

Example 2

Penta sodium amino tri(methylphosphonate), $$N\text{-}(CH_2P(O)_3Na_2)_2(CH_2P(O)_3HNa)$$

was prepared by dissolving the free acid obtained in Example 1 in 140 ml. of 10% NaOH solution and evaporating the aqueous solution to dryness at about 140° C. with the anhydrous form of the salt being formed.

Example 3

A fresh water type mud was tested using various quantities of amino tri(methylphosphonic acid), $$N(CH_2PO_3H_2)_3$$

The mud was comprised of an aqueous slurry of clay and water containing 35% solids. The clay was a blend, on a dry basis, of one part Wyoming Bentonite, four parts Dixie bond clay, and ten parts Tennessee ball clay. Caustic was added in amounts between .2–.8 gram to control the pH of the slurry. The samples in this and the following drilling mud examples were tested by means of the standard procedures given in "Recommended Practice for Standard Feld Proceure for Testing Drilling Fluids" of the American Petroleum Institute. The following are the results of the tests.

TABLE 1

| Deflocculating Agent, lbs./bbl. | Caustic, g. | Viscosity at 300 r.p.m. Fann, cps. | Gel strength | | Filtration rate, cc. in 30 min., API | pH |
|---|---|---|---|---|---|---|
| | | | 0 min. | 10 min. | | |
| (1) 0 | 0 | 65.0 | 55.0 | 57.0 | 25.1 | 5.8 |
| (2) .5 | .2 | 8.5 | .5 | .5 | 14.2 | 6.3 |
| (3) 1.0 | .4 | 12.5 | .5 | .5 | 10.2 | 6.3 |
| (4) 2.0 | .8 | 17.5 | .5 | 1.0 | 9.6 | 6.1 |

The above compositions were subjected for 72 hours to a temperature of 300° F. cooled to room temperature, and then retested by the same procedures originally used. The data obtained are presented herebelow.

TABLE 2

| Deflocculating Agent | Viscosity, 300 r.p.m. Fann, cps. | Gel strength | | Filtration rate, cc. in 30 min., API |
|---|---|---|---|---|
| | | 0 min. | 10 min. | |
| (2) | 11.5 | 10.0 | 12 | 28.4 |
| (3) | 14.0 | 1.0 | 20 | 16.4 |
| (4) | 34.5 | 1.5 | 19 | 9.0 |

As can be observed from the above Tables 1 and 2, the addition of from .5 to 2 lbs. per bbl. of the deflocculating agent effects a dramatic and significant reduction in viscosity while enhancing the thixotropic properties and the filtration rate characteristics of the mud. Note, also, that the muds withstood the subjection to high temperatures without having their properties adversely affected.

Example 4

A high pH, sea water type mud was tested using various quantities of amino tri(methylphosphonic acid), $N(CH_2PO_3H_2)_3$. The mud was comprised of an aqueous slurry of clay and water containing 35% solids. The clay was a blend, on a dry basis, of one part Wyoming Bentonite, four parts Dixie bond clay, and ten parts Tennessee ball clay. Caustic was added in amounts between 2.5–4 g. to control the pH of the slurry. The following are the results of the tests.

TABLE 3

| Deflocculating Agent, lbs./bbl. | Caustic, g. | Viscosity at 300 r.p.m. Fann, cps. | Gel strength | | Filtration rate, cc. in 30 min., API | pH |
|---|---|---|---|---|---|---|
| | | | 0 min. | 10 min. | | |
| (1) 0 | 2.5 | Plastic | Plastic | | 32.5 | 12.85 |
| (2) .5 | 2.0 | 36.0 | 33.0 | 60.0 | 16.6 | 10.75 |
| (3) 1.0 | 3.0 | 16.5 | 3.5 | 32.0 | 11.5 | 11.38 |
| (4) 2.0 | 4.0 | 29.5 | 22.0 | 58.0 | 13.1 | 12.0 |

The above compositions were subjected for 72 hours to a temperature of 300° F., cooled to room temperature, and then retested by the same procedures originally used. The data obtained are presented herebelow.

TABLE 4

| Deflocculating Agent | Viscosity, 300 r.p.m. Fann, cps. | Gel strength | | Filtration rate, cc. in 30 min., API |
|---|---|---|---|---|
| | | 0 min. | 10 min. | |
| (2) | Plastic | Plastic | Plastic | Plastic |
| (3) | ---do--- | ---do--- | ---do--- | ---Do--- |
| (4) | 50 | 44 | 94 | 10. |

Note from the above Table 3 that the addition of from .5 to 2 lbs. per bbl. of the deflocculating agent effects a dramatic and significant reduction in viscosity while enhancing the thixotropic properties and the filtration rate characteristics of the mud. Note from Table 4 that the mud containing 2 lbs. per bbl. of the deflocculating agent withstood the subjection to high temperatures without having its properties adversely affected.

*Example 5*

A lime treated mud was tested using various quantities of amino tri(methylphosphonic acid), $N(CH_2PO_3H_2)_3$. The mud was comprised of an aqueous slurry of clay and water containing 35% solids. The clay was a blend, on a dry basis, of one part Wyoming Bentonite, four parts Dixie bond clay, and ten parts Tennessee ball clay. Caustic and lime were added in the amounts as indicated with the following results of the tests.

TABLE 5

| Deflocculating Agent, lbs./bbl. | Caustic, g. | Lime, g. | Viscosity, 300 r.p.m. Fann, cps. | Gel strength | | Filtration rate, cc. in 30 min., API | pH |
|---|---|---|---|---|---|---|---|
| | | | | 0 min. | 10 min. | | |
| (1) 0 | 1.0 | 5.0 | Plastic | Plastic | | 115.0 | 13.7 |
| (2) 1.0 | 1.0 | 5.0 | 5.5 | 5.0 | 15.0 | 64.0 | 12.9 |
| (3) 2.0 | 1.5 | 5.0 | 6.0 | .5 | 4.0 | 60.3 | 12.9 |
| (4) 3.0 | 2.0 | 5.0 | 6.5 | .5 | .5 | 33.2 | 12.75 |

The above compositions were subjected for 72 hours to a temperature of 300° F., cooled to room temperature, and then retested by the same procedures originally used. The data obtained are presented herebelow.

TABLE 6

| Deflocculating Agent | Viscosity, 300 r.p.m. Fann, cps. | Gel strength | | Filtration rate, cc. in 30 min., API |
|---|---|---|---|---|
| | | 0 min. | 10 min. | |
| (2) | 9.5 | 7 | 38 | 53.0 |
| (3) | 10.0 | 42 | 40 | 31.5 |
| (4) | 34.5 | 4 | 86 | 18.0 |

From the above Tables 5 and 6 it can be noted, as with the previous tests, that the addition of minor amounts, in this instance 1 to 3 lbs. per bbl. of the deflocculating agent, effects a dramatic and significant reduction in viscosity while enhancing the thixotropic properties and the filtration rate characteristics of the mud. Note, also, that here again the muds withstood the subjection to high temperatures without having their properties adversely affected.

It can, therefore, be appreciated from the foregoing tests that the deflocculating agent is effective in many and varied types of drilling muds and by being hydrolytically stable is especially suited for the severe conditions placed on the muds.

As previously mentioned, the deflocculating agent is especially suited for use in kaolin clay slurries. In kaolin processing it is common to find kaolin slurries used in transporting kaolin from the mine to the plant and the processing in the plant may also be performed on the slurries. Customarily the processing is done on a de-flocculated-flocculated-redeflocculated slurry system with the redeflocculation or final deflocculation accomplished prior to spray drying or drum drying. In addition, kaolin is sometimes shipped to users in the slurry form. As can be appreciated contaminants in the kaolin, effects of flocculating additives and other agents used in the process, and the variations in temperature encountered are some of the severe conditions placed on the functioning of the deflocculating agent. It is therefore believed appreciated that a deflocculating agent which is relatively hydrolytically stable would be a distinct advantage in kaolin slurry processing.

The amounts necessary for the deflocculating agent to deflocculate the kaolin slurry is dependent on many factors, the most important of which is the viscosity desired, however, in any case only a minor amount is usually sufficient.

*Example 6*

The deflocculating agent amino tri(methylphosphonic acid) $N(CH_2PO_3H_2)_3$, was tested in a carefully controlled kaolin slurry. The kaolin used in the evaluation was essentially free of impurities and placed in an aqueous slurry with a solids content about 63%. The slurry throughout the evaluation was maintained at a pH of 7 with NaOH. Viscosity measurements were made with the Rotovisco rotational viscometer. Newtonian shear rates of from 7 to 1139 sec.$^{-1}$ were used. The data was converted into apparent Newtonian viscosities, the results of which are tabluated below at 126.6 sec.$^{-1}$ rate of shear, a rate which is believed representative of the tests.

TABLE 7

| Deflocculating agent solids basis (percent): | Apparent Newtonian viscosity, cp. |
|---|---|
| 0 | 1200 |
| .01 | 680 |
| .02 | 180 |
| .03 | 160 |
| .04 | 100 |
| .05 | 80 |
| .06 | 70 |
| .08 | 70 |

From the above test results it can be observed that even as little as .01 percent of the amino tri(methylphosphonic acid) reflected a dramatic change in viscosity of the kaolin slurry. Additional minor amounts continued this change until approximately .06 percent had been added, at which time the viscosity appeared to have achieved a constant value. Thus, as little as .06 percent of the deflocculating agent resulted in an approximate 17 fold reduction in viscosity value.

*Example 7*

Another test substantially the same as the immediately preceding one was made except that calcium chloride (15% based on clay solids) was added to the slurry prior to the tests. In addition, the kaolin slurry had a solids content of 68% and the apparent viscosity was determined with the Stormer viscometer at 300 r.p.m., therefore, the values obtained will not correlate exactly with the preceding results. The results of the test are tabulated below:

TABLE 8

| Deflocculating agent solids basis (percent): | Apparent viscosity, cp. Stormer at 300 r.p.m. |
|---|---|
| .2 | 1500 |
| .3 | 460 |
| .4 | 360 |
| .5 | 350 |

It was necessary in running the above tests to add about .2% of amino tri(methylphosphonic acid) before measurements on the Stormer viscometer could be made. Note, however, when between .2 and .5% of deflocculating agent was added the viscosity value was reduced approximately 4 fold, a significant and marked change in viscosity. The calcium chloride salt which was added in the amount indicated as a contaminant to the kaolin slurry in this test is a known potent flocculating agent which is capable of reflocculating a deflocculated slurry.

Aqueous dispersions of other types of finely divided solid materials in a deflocculated condition can be prepared using the amino methylphosphonic acids or their salts. Such slurry systems as water-base paint pigment suspensions and cement slurries can sometimes be improved by the addition of minor amounts of the deflocculating agent.

When used as a deflocculating agent in aqueous slurries of organic finely divided solid materials, such as coal slurries, the long chain aliphatic hydrocarbon di(lower alkylidenephosphonic acids) and their salts proved to be particularly effective. Long chain aliphatic hydrocarbon di(lower alkylidenephosphonic acids) are of the following formula:

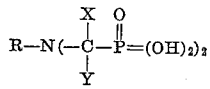

wherein: R represents aliphatic hydrocarbons containing from 6 to 30 carbon atoms and X and Y represent hydrogen or lower alkyl (1-4 carbon atoms). For example, the tetra sodium salt of tetradecyl amino di(methylphosphonic acid), $C_{14}H_{29}N(CH_2P(O)(ONa)_2)_2$, was found to be over twice as effective as sodium tripolyphosphate, a known deflocculating agent, in a coal slurry when compared under carefully controlled conditions.

Example 8

Into a conventional 3-necked, 3-liter flask fitted with a reflex condenser, stirrer and thermometer were charged 426 grams of tetradecylamine, 485 grams of diethylphosphite and 325 grams of 36% aqueous formaldehyde solution. The mixture was heated to about 70° C. at which temperature the reaction became exothermic with the temperature rising to about 120° C. The flask was allowed to cool to room temperature and the reaction product was extracted with benzene. The solvent was separated from the oily product by distillation. The product was refluxed with about 1,000 ml. of concentrated hydrochloric acid for a period of about 24 hours. The hydrolysis product, a precipitate, was removed from the aqueous solution by filtration. The free acid, tetradecyl amino di(methylphosphonic acid), $C_{14}H_{29}N(CH_2P(O)(OH)_2)_2$, was obtained in a quantity of 246 grams. The equivalent weight of the free acid, by titration, was found to be 137.1 as compared with the calculated value of 133.8.

As can be appreciated, therefore, amino methylphosphonic acids and their salts are extremely versatile deflocculating agents and it is intended that this invention cover their broad use in aqueous dispersions of finely divided solid materials and the resulting compositions therefrom.

What is claimed is:

1. A slurry comprising an aqueous vehicle containing finely divided solid materials selected from the class consisting of coal and inorganic solid materials selected from the group consisting of clays, bauxite, phosphate-containing ores, cements and pigments, and, as a deflocculating agent to disperse said solid materials into a finely divided dispersion, a compound selected from the group consisting of acids having the formula:

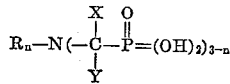

wherein: $n$ is an integer from 0 to 1 inclusive; R is a member selected from the group consisting of hydrogen, aliphatic hydrocarbons, halo-substituted aliphatic hydrocarbons, hydroxy-substituted aliphatic hydrocarbons, said hydrocarbon groups containing from 1 to 30 carbon atoms, and

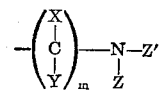

wherein: $m$ is an integer from 1 to 30 inclusive; Z is a member selected from the group consisting of hydrogen and

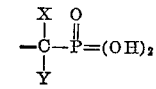

Z' is a member selected from the group consisting of

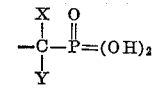

and

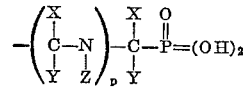

wherein: $p$ is an integer from 1 to 30 inclusive; and X and Y are members selected from the group consisting of hydrogen and alkyl groups containing from 1 to 30 carbon atoms; and their water soluble salts.

2. A slurry comprising an aqueous vehicle containing inorganic finely divided solid materials selected from the group consisting of clays, bauxite, phosphate-containing ores, cements and pigments, and, as a deflocculating agent to disperse said solid materials into a finely divided dispersion, a compound selected from the group consisting of acids having the formula:

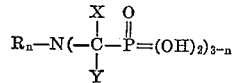

wherein: $n$ is an integer from 0 to 1 inclusive; R is a member selected from the group consisting of hydrogen, aliphatic hydrocarbons, halo-substituted aliphatic hydrocarbons, hydroxy-substituted aliphatic hydrocarbons, said hydrocarbon groups containing from 1 to 30 carbon atoms, and

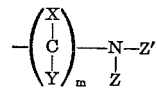

wherein: $m$ is an integer from 1 to 30 inclusive; Z is a member selected from the group consisting of hydrogen and

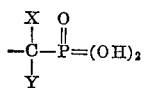

Z' is a member selected from the group consisting of

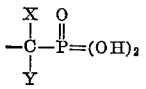

and

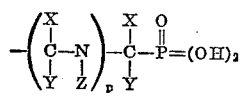

wherein: $p$ is an integer from 1 to 30 inclusive; and X and Y each have the structure $C_xH_{2x+1}$ wherein $x$ is an integer from 0 to 4 inclusive; and their water soluble salts.

3. A slurry according to claim 2, wherein said deflocculating agent is selected from the group consisting of amino tri(methylphosphonic acid) and its water soluble salts.

4. A drilling fluid comprising an aqueous suspension of clay and, as a deflocculating agent, a compound selected from the group consisting of acids of the formula:

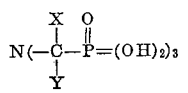

wherein: X and Y each have the structure $C_xH_{2x+1}$ wherein $x$ is an integer from 0 to 4 inclusive, and their water soluble salts.

5. A method for preparing a drilling fluid comprising dissolving in an aqueous slurry containing clay a deflocculating agent selected from the group consisting of acids of the formula:

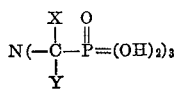

wherein: X and Y each have the structure $C_xH_{2x+1}$ wherein $x$ is an integer from 0 to 4 inclusive, and their water soluble salts.

6. A drilling fluid comprising an aqueous suspension of clay and, as a deflocculating agent a compound having the formula:

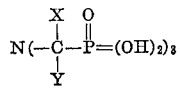

wherein: X and Y each have the structure $C_xH_{2x+1}$ wherein $x$ is an integer from 0 to 4 inclusive, said deflocculating agent being present in an amount sufficient to alleviate the tendency of the clay particles to flocculate.

7. A drilling fluid comprising an aqueous suspension of clay and, as a deflocculating agent, amino tri(methylphosphonic acid).

8. A drilling fluid comprising an aqueous suspension of clay and, as a deflocculating agent, a water soluble salt of an acid having the formula:

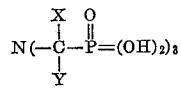

wherein: X and Y each have the structure $C_xH_{2x+1}$ wherein $x$ is an integer from 0 to 4 inclusive, said deflocculating agent being present in an amount sufficient to alleviate the tendency of the clay particles to flocculate.

9. A drilling fluid comprising an aqueous suspension of clay and, as a deflocculating agent, pentasodium amino tri (methylphosphonate).

10. A kaolin slurry comprising an aqueous suspension of kaolin and, as a deflocculating agent, a compound selected from the group consisting of acids of the formula:

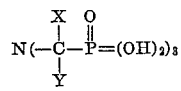

wherein: X and Y each have the structure $C_xH_{2x+1}$ wherein $x$ is an integer from 0 to 4 inclusive, and their water soluble salts.

11. A method for preparing a kaolin slurry comprising dissolving in an aqueous slurry containing kaolin a deflocculating agent selected from the group consisting of acids of the formula:

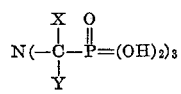

wherein: X and Y each have the structure $C_xH_{2x+1}$ wherein $x$ is an integer from 0 to 4 inclusive, and their water soluble salts.

12. A kaolin slurry comprising an aqueous suspension of kaolin and, as a deflocculating agent, a compound having the formula:

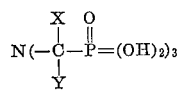

wherein: X and Y each have the structure $C_xH_{2x+1}$ wherein $x$ is an integer from 0 to 4 inclusive, said deflocculating agent being present in an amount sufficient to alleviate the tendency of the kaolin particles to flocculate.

13. A kaolin slurry comprising an aqueous suspension of kaolin and, as a deflocculating agent, amino tri(methylphosphonic acid).

14. A kaolin slurry comprising an aqueous suspension of kaolin and, as a deflocculating agent, a water soluble salt of an acid of the formula:

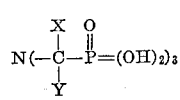

wherein: X and Y each have the structure $C_xH_{2x+1}$ wherein $x$ is an integer from 0 to 4 inclusive, said deflocculating agent being present in an amount sufficient to alleviate the tendency of the kaolin particles to flocculate.

15. A kaolin slurry comprising an aqueous suspension of kaolin and, as a deflocculating agent pentasodium amino tri(methylphosphonate).

16. A coal slurry comprising an aqueous suspension of coal and, as a deflocculating agent, a compound selected from the group consisting of acids having the formula:

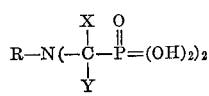

wherein: R represents aliphatic hydrocarbons containing from 6 to 30 carbon atoms and X and Y each have the structure $C_xH_{2x+1}$ wherein $x$ is an integer from 0 to 4 inclusive, and their water soluble salts; said deflocculating agent being present in an amount sufficient to alleviate the tendency of the coal particles to flocculate.

17. A method for preparing a coal slurry comprising dissolving in an aqueous slurry containing coal a deflocculating agent selected from the group consisting of acids of the formula:

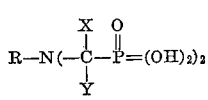

wherein: R represents aliphatic hydrocarbons containing from 6 to 30 carbon atoms and X and Y each have the structure $C_xH_{2x+1}$ wherein $x$ is an integer from 0 to 4 inclusive, and their water soluble salts.

18. A coal slurry comprising an aqueous suspension of coal and, as a deflocculating agent, an alkali metal salt of an alkyl amino di(methylphosphonic acid) of the formula:

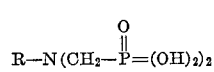

wherein: R is an alkyl group containing 6 to 30 carbon atoms.

19. A coal slurry comprising an aqueous suspension of coal and, as a deflocculating agent, tetrasodium tetradecyl amino tri(methylphosphonate).

20. A drilling mud concentrate composition useful when incorporated in an aqueous vehicle as a drilling fluid comprising clay and, as a deflocculating agent, a compound selected from the group consisting of acids having the formula:

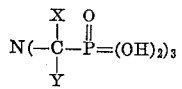

wherein: X and Y each have the structure $C_xH_{2x+1}$ wherein $x$ is an integer from 0 to 4 inclusive, and their water soluble salts, said deflocculating agent being present in amounts within the range of about 0.06 to about 0.3 weight percent of said clay.

21. The composition of claim 20, wherein said compound is amino tri(methylphosphonic acid).
22. The composition of claim 20, wherein said compound is pentasodium amino tri(methylphosphonate).

References Cited

UNITED STATES PATENTS

| | | | |
|---|---|---|---|
| 2,599,807 | 6/1952 | Bersworth | 260—500 |
| 2,635,112 | 4/1953 | Fields | 252—357 |
| 3,234,124 | 2/1966 | Irani | 210—38 |
| 3,257,479 | 6/1966 | Irani et al. | 260—500 X |
| 3,288,846 | 11/1966 | Irani et al. | 260—500 |

OTHER REFERENCES

Petrov et al.: "Synthesis of Amino Diphosphonates and Aminotriphosphonates," Article in Chemical Abstracts, vol. 54 (1960), page 260.

Schwartz et al.: Surface Active Agents, First Edition published 1949 by Interscience Publishers, Inc. of New York, pages 324 to 328.

LEON D. ROSDOL, *Primary Examiner.*

HERBERT B. GUYNN, *Examiner.*